United States Patent [19]

Grossberndt

[11] Patent Number: 4,544,313
[45] Date of Patent: Oct. 1, 1985

[54] SELF-TAPPING SCREW

[75] Inventor: Hermann Grossberndt, Laasphe, Fed. Rep. of Germany

[73] Assignee: EJOT Eberhard Jaeger GmbH & Co. KG, Laasphe, Fed. Rep. of Germany

[21] Appl. No.: 617,143

[22] Filed: Jun. 4, 1984

Related U.S. Application Data

[63] Continuation of Ser. No. 968,091, Dec. 8, 1978, abandoned.

[30] Foreign Application Priority Data

Dec. 9, 1977 [DE] Fed. Rep. of Germany ....... 2754870

[51] Int. Cl.$^4$ .................... F16B 25/00; F16B 33/02
[52] U.S. Cl. .................................. 411/411; 411/424
[58] Field of Search ............... 411/411, 423, 424, 308, 411/309, 310, 311

[56] References Cited

U.S. PATENT DOCUMENTS

| Re. 3,941 | 4/1870 | Pierce | 411/406 |
|---|---|---|---|
| 1,798,604 | 3/1931 | Hoke | 411/222 X |
| 3,726,330 | 4/1973 | Adler | 411/411 X |
| 3,902,399 | 9/1975 | Yotti | 411/414 |
| 3,911,781 | 10/1975 | Bappert | 411/418 |
| 3,942,405 | 3/1976 | Wagner | 411/412 X |
| 4,027,573 | 6/1977 | Laverty | 411/413 |

FOREIGN PATENT DOCUMENTS

| 876474 | 8/1942 | France | 85/46 |
|---|---|---|---|
| 508867 | 7/1937 | United Kingdom | 85/46 |
| 482577 | 1/1976 | U.S.S.R. | 85/46 |

Primary Examiner—Thomas J. Holko
Attorney, Agent, or Firm—Flynn, Thiel, Boutell & Tanis

[57] ABSTRACT

A self-tapping screw. The core of the screw between adjacent threads has a constricted portion, the narrowestmost point thereof lying approximately in the center between the two adjacent threads. The core is tapered expanding outwardly from the constriction to the bases of the two adjacent threads.

4 Claims, 3 Drawing Figures

4,544,313

SELF-TAPPING SCREW

This application is a continuation of U.S. Ser. No. 968,091, now abandoned, filed Dec. 8, 1978.

FIELD OF THE INVENTION

The invention relates to a self-tapping screw having a large ratio between the outside diameter and the core diameter, a small thread angle and a small ratio between the outside diameter and pitch of the threads.

BACKGROUND OF THE INVENTION

Screws of this type provide a good securement in soft material, in particular also in particle boards, because of the large bearing depth, which results from the large ratio between the outside diameter and core diameter, namely, the threads are very high in relationship to the diameter of the screw. Because of the relatively large pitch (small relationship between outside diameter and axial spacing of the threads) much space remains between the threads, so that the material into which the screw is rotated can engage with relatively large cross sections between the threads. A good cutting action of the threads and a large free space between two adjacent threads is achieved through the small thread angle. However, screws of this type can also be screwed into sheet metal which is not very thick and self-tap grooves therein, into which are received the threads. One can hardly speak of a complete thread in this case.

Screws of this type can be manufactured economically through a chipless shaping. Because of the thin and high thread height, a very large amount of deformation of the screw material is necessary. The forming tools have the tendency to jam up between the steep threads, which creates high friction forces. This can result in untrue or noncircular cross sections of the screws and cause a large amount of wear to the tools.

Furthermore double-threaded screws are known, wherein one screw helix has a higher profile than the helix extending parallel thereto, so that alternately high and low threads appear on the screw.

In both known screws, the height of the thread profile cannot be fully utilized for support purposes because the material which is removed by the threads must find room in the space between the threads and accumulates substantially on the core. Thus a layer is formed on the core, viewed in a simplified manner, which layer prevents the threads from penetrating completely into the material, namely up to the shoulder on the screw core.

The invention provides a screw construction of the above-mentioned type wherein the threads function over their entire height as a supporting surface. The screw is hereby able to be manufactured with less deformation work than the known screws.

This purpose is attained according to the invention by providing a constriction in the area between two threads which project from the core, the most narrow point of which lies approximately in the center between two threads, and the core is tapered starting from the bases of two adjacent threads.

In the inventive screw, the constriction extends helically parallel to the threads. In comparison with the above-mentioned known screw having high and low threads thereon, the inventive screw thus does not have between two threads an elevation in the form of a low thread, but a recess. Material which is removed by the threads can move into this recess. Moving into the recess is favored by the core construction which is tapered starting out from the bases of the thread flanks. In this manner, surfaces are formed on which the material can slide. This makes it possible that the threads penetrate into the material until their base engages the material. As a result, the supporting force is increased. Also the inventive screw can easily be deformed since during the manufacture of the constriction, material is already displaced in direction of the threads, so that the threads can be formed with smaller forces through cold rolling than is possible with a screw having a cylindrical shank. In such known screws having a cylindrical shank very large radial forces are necessary in order to displace the material to the threads. These advantages in the deformation sequence are particularly important in threads having high narrow thread profiles and a large axial pitch, because such screws require, due to their nature, much more deformation than screws having normal threads.

The screw may have a drill point at the tip thereof. It is then suited also for slightly harder materials. It can also be used to drill holes into sheet metal whereby after penetration of the fluted threads the screw is rotated directly into the threaded hole.

The invention can be applied well on screws, which have an outside diameter of between 3 and 6 mm., even though the invention is not to be limited to these sizes.

BRIEF DESCRIPTION OF THE DRAWINGS

One exemplary embodiment of the invention is illustrated in the drawings, in which.

DETAILED DESCRIPTION

Figure 1:
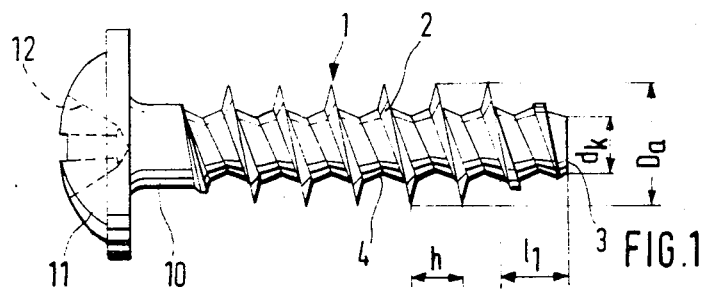
FIG. 1 is an enlarged side view of an inventive screw.

The screw according to FIG. 1 has a self-tapping thread which is identified as a whole by the reference numeral 1. The threads 2 are relatively thin and high and have in relationship to the screw diameter $D_a$ a relatively large pitch h.

The screw has, as this is common in self-tapping screws, at its tip end a cutting area, which extends axially approximately over the length $l_1$. The height of the threads reduces more and more toward the end 3 of the screw in the cutting area, namely to the core diameter of the screw. The smallest diameter of the region between two threads 2 is to be considered as the core diameter $d_k$ of the screw. A constriction 4 exists in this intermediate region, which constriction extends naturally also helically along the screw parallel to the thread.

Figure 2:
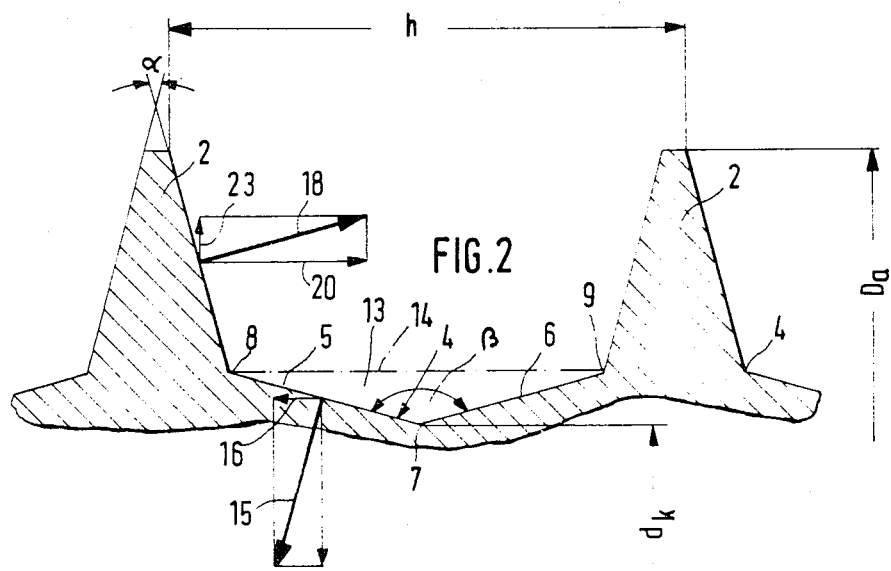
FIG. 2 illustrates an enlarged thread profile view of an inventive screw.

The theoretical aspects of the profile of the screw are illustrated in FIG. 2. This theoretical profile cannot be achieved in the actual design of the screw but the dimensions of the actual design are sufficiently close to the theoretical values as to cause the theoretical values to apply. According to the theoretical profile, the profile of the constriction 4 is defined by two straight lines 5 and 6, which extend roof-shaped or at an angle to one another. The lines 5 and 6 intersect at a point 7. The point 7 corresponds to the most narrow diameter of the core $d_k$. The lines 5 and 6 correspond to conical surfaces expanding radially from the constriction to the bases 8 and 9, from which rise the thread profiles. The thread angle $\alpha$ of the thread profiles 2 is 30° in the illustrated example, while the angle $\beta$ between the straight lines 5, 6 is 120°.

Further dimensional relationships are as follows. The relationship or ratio between the screw outside diameter $D_a$ and the constricted screw core diameter $d_k$ is approximately 1.85 the illustrated example. The relationship or ratio between the thread outside diameter $D_a$ and the pitch h (axial spacing between two adjacent threads) is approximately 2.25.

The screw has, following the thread section, a short cylindrical shank 10, to which a head 11 is connected and in which is provided a cross slot 12. This further construction of the screw is of no importance for the invention. The screw head could also be constructed differently. It could, for example, have a common screw driver slot or a hexagonal head. It would also be possible to provide at the tip end of the screw a drill point or a thread similar to the tip end of a wood screw.

Material will collect in the annular space 13 encircling the core, the profile of which is defined by the line 5, 6 and the dash-dotted line 14, which connects the bases 8, 9, which material is displaced by the threads 2 upon rotation into the material. The moving of the material into the space 13 is enhanced by the surfaces which are defined by the lines 5 and 6 having favorable sliding surfaces for the material to be transported into said space 13. This permits the threads 2 to penetrate into the material up to their base points 8, 9.

Figure 3:
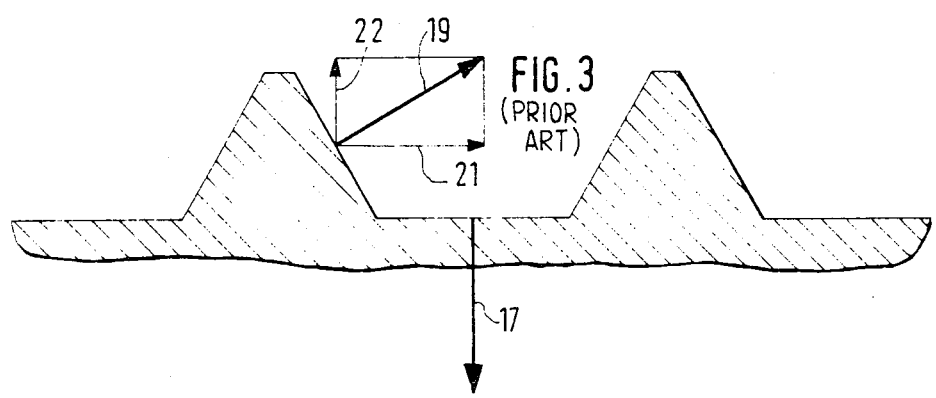
FIG. 3 illustrates a thread profile of a conventional screw.

FIGS. 2 and 3 symbolically illustrate forces which occur during the thread shaping process. During shaping of the constriction 4, the rolling force 15 has a force component 16 in direction toward the adjacent thread 2. Such a force component is lacking, if a cylindrical core exists, as this is illustrated in FIG. 3. The rolling force 17 which is illustrated in FIG. 3 does not have an axial component which is directed toward the threads. Therefore, the force 17 must be very great in order to cause material to flow toward the threads.

Additionally shown are the pressure forces 18 (FIG. 2) or 19 (FIG. 3), which act on the flanks of the threads. In the case of the relatively steep threads according to FIG. 2, the force 18 has a very large component 20 in direction of the screw axis, while in the case of the less steep threads according to FIG. 3, the corresponding component 21 is substantially smaller. The components 20 or 21 act in the sense of a clamping of forming elevations on the rolling tool, namely during the manufacture of steep threads according to FIG. 2, a jamming occurs more likely than during the manufacture of a thread profile according to FIG. 3. Since, however, and due to the component 16 (FIG. 2), the rolling forces can be kept smaller as a whole than in a cylindrical core, one obtains in the inventive screw a lesser amount of wear on the tools than is the case during the manufacture of a screw having a cylindrical shank and equal profiled threads.

Also FIGS. 2 and 3 show that in most common thread angles of 60° (FIG. 3), the radial components 22 of the force 19 are greater than the radial components 23 of the corresponding force 18 in small thread angles. The radial components 22, 23 act radially outwardly tending to burst hollow elements, for example hollow plastic sleeves or anchors, into which the screw is rotated. Therefore, such hollow elements can be dimensioned smaller in the case of a small thread angle than in the case of screws having a large thread angle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-tapping screw formed by chipless rolling comprising an elongated core with threads thereon projecting radially outwardly therefrom having a large ratio between the outside diameter of said threads and the core diameter, a small thread angle on said threads and a small ratio between said outside diameter of said threads and the pitch dimension said threads, said core between two adjacent threads being constricted, the most narrow point of which lies approximately in the center between said two adjacent threads, and said core being tapered expanding outwardly from said constriction to the bases of said two adjacent threads, said most narrow point defining the location of the measurement of said core diameter, said ratio between said outside diameter ($D_a$) of said threads and said core diameter ($d_k$) being approximately 1.85, said thread angle ($\alpha$) being approximately 30°, and said ratio between said outside diameter ($D_a$) and said pitch (h) of said threads being approximately 2.25.

2. The screw according to claim 1, wherein the profile of said constriction is defined by two substantially straight lines, which are inclined to one another and which extend in direction of the screw axis.

3. The screw according to claim 1, wherein said thread is a single thread.

4. The screw according to claim 1, wherein said outside diameter ($D_a$) is in the range of 3 to 6 mm.

* * * * *